H. BROWN & N. D. ROSS.
Churns.
No. 148,922. Patented March 24, 1874.
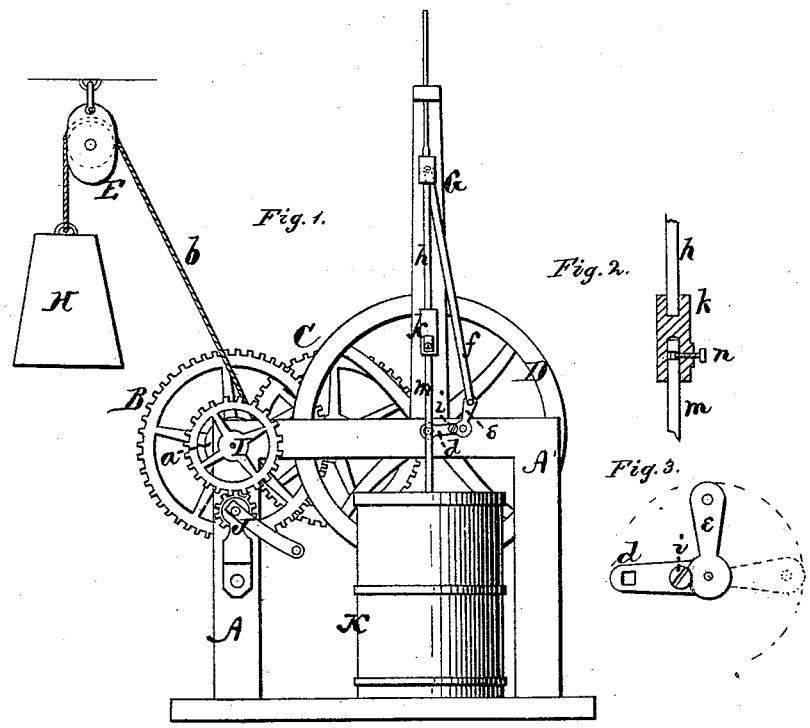

UNITED STATES PATENT OFFICE.

HENRY BROWN AND NATHAN D. ROSS, OF WYALUSING, PENNSYLVANIA.

IMPROVEMENT IN CHURNS.

Specification forming part of Letters Patent No. 148,922, dated March 24, 1874; application filed January 12, 1874.

*To all whom it may concern:*

Be it known that we, HENRY BROWN and NATHAN D. ROSS, of Wyalusing, in the county of Bradford and in the State of Pennsylvania, have invented certain new and useful Improvements in Churns; and do hereby declare that the following is a full, clear, and exact description thereof, reference being had to the accompanying drawings and to the letters of reference marked thereon, making a part of this specification.

The nature of our invention consists in the construction and arrangement of a churn to be operated by a weight, as will be hereinafter more fully set forth.

In the accompanying drawings, Figure 1 is a side elevation of our churn. Fig. 2 is an enlarged section of the coupling connecting the dasher-rod with the operating mechanism; and Fig. 3 is an enlarged view of a crank in the machine.

A represents the frame containing the operating mechanism. This mechanism consists of a drum, *a*, fastened securely upon a central shaft, and connected by a suitable pawl and ratchet with a large cog-wheel, B, placed loosely on said shaft, and this cog-wheel gears with a pinion upon the same shaft as another large cog-wheel, C. This cog-wheel gears with a pinion on the same shaft as a fly-wheel, D. Around the drum *a* is wound a rope or chain, *b*, the end of which is passed upward over a pulley-block, E, and has a weight, H, attached to it. By this means a rapid revolving motion is imparted to the fly-wheel and its shaft. Upon the end of the drum-shaft is attached a cog-wheel, I, gearing with a pinion and crank, J, by means of which the rope or chain *b* is wound up on the drum. Upon the end of the fly-wheel shaft is secured a crank, *d*, which has an arm, *e*, pivoted to its outer end. This arm is held at any desired angle with the crank by means of a set-screw, *i*. From the outer end of the arm *e* a pitman, *f*, connects with a vertical shaft, *h*, which passes through a guide-arm, G, attached to the frame A. At the lower end of the shaft *h* is secured a coupling, *k*, in the lower end of which the upper end of the dasher-rod *m* is loosely inserted. In the upper end of the dasher-rod *m* is made a circumferential groove, as shown in Fig. 2, into which a set-screw, *n*, passing through the coupling, enters to prevent the dasher-rod from coming out, and yet allow it to revolve.

The dashers are attached to or on the lower end of the dasher-rod *m*, and work in the churn K.

The dashers may be of any desired construction, only so that they are beveled and do not strike the milk flat in their upward and downward movement.

The machine being in operation, the dashers are moved perpendicularly up and down by the revolution of the crank *d e*, and the movement of the pitman *f* and shaft *h*. The dashers L, by their movement through the milk, are made to revolve independent of their up and down movement, thereby facilitating and accelerating the process of churning.

By turning the arm *e* of the crank to different angles the length of the stroke of the dashers is easily regulated, as desired.

Having thus fully described our invention, what we claim as new, and desire to secure by Letters Patent, is—

1. The combination of the vertically-reciprocating and rotating dasher-rod *m*, provided with a circumferential groove at its upper end, coupling *k*, set-screw *n*, vertical shaft *h*, all constructed substantially as and for the purposes herein set forth.

2. In combination with the dasher-shaft *m h* and the pitman *f*, the crank *d*, attached to the power-shaft, the arm *e*, pivoted to the end thereof, and the set-screw *i* for adjusting said arm at any desired angle, as shown, and for the purposes set forth.

In testimony that we claim the foregoing we have hereunto set our hands this 29th day of December, 1873.

HENRY BROWN.
      NATHAN D. ROSS.

Witnesses:
 G. K. THOMPSON,
 A. E. LOSEY.